April 28, 1964     L. E. NAGAN     3,131,144
FILTRATION PROCESS
Filed May 21, 1959
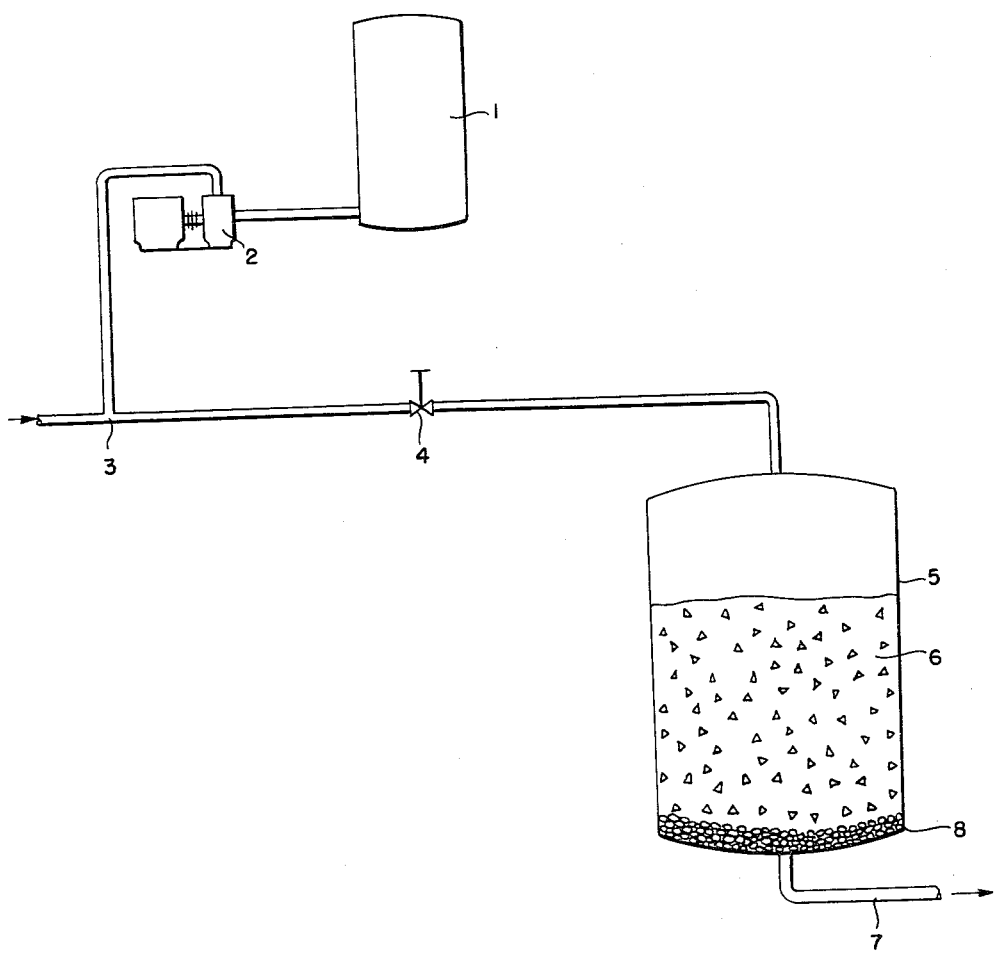
INVENTOR:
LEO E. NAGAN
BY *Marzall, Johnston,*
*Cook & Root*
ATT'YS United States Patent Office 3,131,144
Patented Apr. 28, 1964

3,131,144
FILTRATION PROCESS
Leo E. Nagan, Mercer Island, Wash., assignor to Nalco Chemical Company, Chicago, Ill., a corporation of Delaware
Filed May 21, 1959, Ser. No. 814,721
7 Claims. (Cl. 210—54)

This invention relates to an improved process and mechanism for removing finely divided suspended solids from aqueous liquids using the principles of filtration. Specifically, the invention relates to an improved method of filtering turbid waters. In a preferred embodiment, the invention provides a method for improving the performance of domestic and industrial sand and anthracite coal filters.

A long sought after development in the filtration art is a chemical treatment or a mechanical system and/or both for pretreatment of liquids containing suspended solids prior to filtration whereby the filtration of such liquids would be measurably increased.

One method of accomplishing this result, particularly where it is desirable to remove large quantities of suspended solids from water, is to first subject the liquids to a pretreatment operation which removes suspended solids by a technique known as coagulation. As practiced, coagulation usually requires addition of chemicals to water, the rapid and uniform mixing of the chemicals to the water, a gentle mixing to form the suspended material into a floc and a subsequent period of relative quiescence to allow the flocced particles to settle from the liquid. The art or practice of coagulation requires careful control of the operation of the process and large investments must be made in equipment to perform the coagulation operation in a successful manner.

Coagulation as such is usually considered to be feasible when the suspended solids contained in the water are excessive to the point that filtration alone is uneconomical or ineffective. In the case of many low turbidity waters, coagulation processes are deemed inexpedient and filtration is the preferred method employed to remove such suspended matter from the water.

In the area of treating these so-called low turbidity waters, numerous attempts have been made to increase the efficiency of the filters acting upon such waters. One method has been to pretreat the filter material with a gelatinous substance to make the filter more attractive to the turbidity. This method, while increasing initial filter pick-up has the disadvantage of bonding the filter material, thus making removal of the entrained particles from the filter by operations such as back-washing difficult. Another approach to the problem has been the pretreatment of the turbid water going into the filter with an inorganic coagulant such as alum to form a floc, which theoretically would be more easily captured by the filter granules. This practice has not been successful since there is rarely a sufficient retention time in most industrial and commercial units to allow the suspended matter to grow into a uniformly filterable floc.

A particularly complex and difficult problem to solve in treating turbid waters using a filtration process is the removal of colloidally suspended organic coloring matter. This material is frequently of such a small particle size or molecular weight that it freely passes through the commonly used filter materials and is not affected to any appreciable degree. Chemical pretreatment of waters containing organic coloring material with such chemicals as alum or copperas will only affect this coloring material to a very limited degree. Also large quantities are necessary to achieve any appreciable results which means radical pH changes occur and metallic hydroxides enter the system. From the above general discussion, it will be recognized the filtration problems in the area of low turbidity waters presents a serious problem to which a practical solution would be greatly welcomed by processors and users of water supplies.

While many filtration materials are used in industrial and domestic applications, by far and large the most common and readily available filtration media are the naturally occurring substances, sand and anthracite coal. Thus for a chemical pretreatment of turbid waters to be acceptable over a broad range of conditions, it must be effective when used in conjunction with sand and anthracite coal filters.

It would be a valuable contribution to the art if a mechanical and/or chemical process were combined to treat turbid and/or colored waters prior to filtration to improve the filtration process. Such a process must, of course, be extremely simple and where chemicals are used, they would of necessity have to be easily prepared and be effecitve at low economical dosages.

In accordance with the invention, it has been found that a filtration process and mechanism is afforded by the furnishing of a tubular conductor for supplying aqueous liquids to a filter and adding to such conductor, prior to the filter, means for treating the aqueous liquids with a few parts per million of a water soluble cationic polymer before the water contacts the filter. The treatment is so regulated that the suspended solids contained in the water are uniformly admixed and brought into contact with the water soluble cationic polymer under such conditions that the suspended solids are not formed into a floc. The water thus treated is passed through a tubular conductor to a conventional filtration device which contains as the filtration medium, a natural substance comprising either sand or anthracite coal. When the water contains as its turbidity organic coloring matter, the water soluble polymer is preferably combined with alum to improve the removal of the coloring matter by the subsequent passage of the water over the filter.

In another aspect, the invention comprises a process of filtering aqueous liquids containing finely divided suspended solids by passing such liquids to a treating zone where they are uniformly admixed with a few parts per million of a water soluble cationic polymer under conditions which inhibit floc formation. The aqueous liquid thus treated is then passed through a filtering zone of the type described above.

For a more comprehensive understanding of the invention, reference should be made to the drawing which shows a typical arrangement for the practice of the invention.

The water soluble cationic polymer is prepared as a dilute solution and is placed into a feeding tank 1, where it is delivered by a suitable chemical proportioning pump 2, into the incoming raw water supply 3, where the chemical is uniformly admixed with the turbid water at the valve 4. The valve 4 is so regulated that it acts as a restriction in the supply line 3 and thus the chemical is uniformly admixed with the turbid water under conditions whereby the formation of a floc is inhibited. The treated water passes from valve 4 into a conventional filter unit 5 which contains a suitable quantity of filtration substance 6 which may be either sand or anthracite coal.

The clarified water is then withdrawn through the filter outlet 7. The filter is constructed in accordance with usual well-known lines and preferably containing a supporting bed of gravel or other crushed solid substance 8.

When the methods and processes of the invention are adhered to, one or more of the following advantages and improvements of conventional filtration processes are achieved:

a. The filter more effectively removes suspended matter and organic color bodies.

b. The filter will remove and retain greater quantities of solid matter before back-washing is required.

c. Increased flow rates may be used without decreasing filter efficiency.

d. The suspended solids content of the effluent water from the filter is greatly reduced.

e. Back-washing is much more easily accomplished.

f. There is less likelihood of compacting of the filter medium.

As previously indicated, the invention is particularly useful in treating low turbidity waters. For purposes of the invention, these low turbidity waters may be considered as containing turbidities of not more than 1,000 parts per million Hellige, expressed as $SiO_2$. Most waters which are considered as being low turbidity waters contain as little as 5 parts per million of suspended solids and many contain as much as several hundred in number. Typical low turbidity waters upon which this invention has shown optimum effectiveness quite frequently contain from 10 to 100 parts per million of suspended solids. When used in accordance with the procedures outlined above, the water soluble cationic polymers described above will give effective results when used to treat low turbidity waters. When used at dosages ranging from as little as one-half part per million to as much as 50 parts per million. As a general rule, most waters are susceptible to dosages ranging between 2 and 10 parts per million.

When the invention is used to treat low turbidity waters containing amounts of organic coloring material, it is desirable to combine with the water soluble cationic polymer alum which materially aids in color removal by the filter. Thus, when the two reagents are employed in conjunction with the other, the weight ratio or polymer to alum will usually be within the range of 1:3 to 1:10 with the preferred ratio being at about 1:3 to 1:5.

Since water supplies vary considerably it is contemplated that experimentation will be required to most effectively utilize the invention. For instance, it may be necessary to try several different dosages of the polymer to determine optimum filtration results. Similarly, experimentation may be necessary to determine polymer-alum ratios. An important variable which must be determined is the amount of mixing and agitation imparted to the treated water to insure adequate mixing and to prevent floc formation.

Since it is necessary to adapt the invention to established water treating installations, a certain amount of improvisation will be necessary to practice the treating steps previously described. Thus, by again referring to the drawing, agitation is again imparted to the treated water by a suitable adjustment of the valve 4. If a suitable valve is not present in a given installation, other mixing equivalents may be substituted without departing from the spirit of the invention. Thus, for instance, orifice pumps, baffles, constructions in the tubular conductor, tortuous points of flow and similar adjustable mixing means may be used to advantage.

The water soluble cationic polymers may be drawn from a large group of chemicals which may be broadly classified as follows:

A. HALOHYDRIN POLYAMINE CONDENSATES

This group of polymers is the most important group since the results obtained with these materials are outstanding.

The hydrophilic alkylene polyamine polyfunctional halohydrin polymers are reaction products of alkylene polyamines with polyfunctional halohydrins such as di-halohydrin, e.g., alpha-dichlorhydrin, dibromohydrin, or diiodohydrin, or any of the corresponding monohalohydrins containing a second functional group capable of reacting with an amino nitrogen atom of the alkylene polyamine, such as, for instance, epichlorohydrin, epibromohydrin, and the like.

The alkylene polyamines which are reacted with the polyfunctional halohydrins for the purpose of the invention are well known compounds and have the general formula:

$$H_2N(CH_{2n}NH)_xH$$

where $n$ is an integer and $x$ is one or more. Examples of such alkylene polyamines are the alkylene diamines, such as ethylene diamine 1,2-propylenediamine, 1,2-propylene diamine, and the polyalkylene polyamines such as, for example, diethylenetriamine, triethylenetetramine, tetraethylenepentamine, diprophylenetriamine, and the similar polypropylene polyamines and polybutylene polyamines.

It has been known for many years that the polyfunctional halohydrins react with amines, including polyamines, to form both monomeric and polymeric reaction products. The first state of the reaction apparently results in the condensation of the halohydrin with the amine to produce a simple monomer. Thus, one mol of epichlorohydrin probably reacts with one mol of diethylenetriamine according to the following equation:

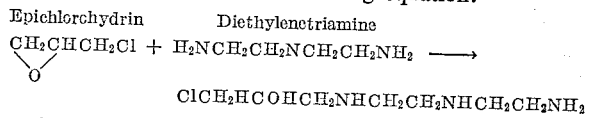

Epichlorohydrin     Diethylenetriamine $ClCH_2HCOHCH_2NHCH_2CH_2NHCH_2CH_2NH_2$

Obviously, the epichlorohydrin can react with both primary amino groups and also with the secondary amino group in the diethylenetriamine, and it is possible for some or all of these reactions to take place simultaneously. Furthermore, the simple monomer unit indicated as the end product of the equation can react with other similar units to produce polymers containing recurring units. If the reaction is carried far enough, cross-linking can occur which is evidenced by gel formation. For the purpose of the present invention, however, it is essential to avoid water insoluble resin or gel formation. Yet the condensation polymerization must be carried sufficiently far to thicken or increase the viscosity of the resultant product but insufficiently far to produce a water soluble gelatinous product.

These are of a relatively high molecular weight which is believed to be in excess of 1,000 and in most cases greater than 2,000, but because of the difficulty in determining molecular weight, the most satisfactory way of ascertaining the proper amount of condensation and polymerization to obtain optimum results is by viscosity measurement. The products which have been found to be especially suitable for the practice of the invention have a minimum viscosity in an aqueous alkaline pH solution containing 20% by weight of the condensation polymer at a temperature of 75° F. of about 7 centipoises. The upper limit of the viscosity is anything short of gel formation and may be, for example, up to 150 to 200 centipoises. However, the preferred range of viscosity is about 14 to 50 centipoises. The viscosity determinations were made by using a 20% polymer solution having a pH of about 12.6.

Aqueous solutions of the condensation polymers are normally alkaline in pH. Stable solutions have been prepared having a pH range within 7.6 to 13.0. The preferred pH range is from 10.5 to 12.8, with the most preferred range being from 11.7 to 12.6. pH ranges above 10.5 are not corrosive to steel shipping containers. The higher pH ranges above 10.5 are obtained by adding a caustic alkali (e.g., NaOH or KOH) to the condensation polymer. It has been observed that viscous polymers alkaline in pH could oftentimes be substantially reduced in their viscosity by treatment with mineral acids.

For convenience, the condensation polymer is preferably prepared at a concentration of around 40% and then diluted with water to a concentration of about 20% polymer solution. A 20% solution may increase very slightly in activity upon aging, but a very dilute solution (e.g. 0.35% solution) displays no noticeable change in activity upon aging. For practical purposes, it is desirable to use the polymer as a 20% solution because this concentration is sufficiently high to avoid shipping large quantities of water and sufficiently low to permit accurate proportioning of the correct amounts. Such solutions are also stable for relatively long periods of time.

The relative proportions of polyamines and polyfunctional halohydrin employed in making polyamines for the purpose of the invention can be varied depending upon the particular type of polyamine and polyfunctional halohydrin and the reaction condition. In general, it is preferable that the molar ratio of the polyfunctional halohydrin to polyamine be at least 1:1 and less than 2:1. Thus, in the preparation of a condensation polymer solution from epichlorohydrin and tetraethylenepentamine, good results have been obtained at a molar ratio of 1.4:1 to 1.94:1.

The following examples in which the quantities are given in parts by weight unless otherwise indicated illustrate preferred compositions coming within the scope of the invention and their use for the purpose of the invention.

Example I

A condensation polymer was prepared from the following reactants.

| Ingredients: | Parts by weight |
| --- | --- |
| Tetraethylenepentamine | 10.3 |
| Epichlorohydrin | 9.7 |
| Water (added prior to reaction) | 25.3 |
| Water (added after reaction is complete) | 54.7 |

The tetraethylenepentamine was dissolved in a volume of water equal to 25.3% of the batch weight. While the solution was being stirred, the epichlorohydrin was added slowly over a 1.5-hour period. During this addition the temperature of the reaction was maintained between 45° C. and 50° C. with cooling. The reaction mixture was allowed to stand for an additional one-half hour with stirring at the same temperature. It was then diluted with the remainder of the water and cooled to room temperature (about 190° C.). The resultant solution contained about 20% by weight of active polymer and had a pH of 7.6.

Example II

A polymer solution was prepared from the following ingredients.

| Ingredients: | Parts by weight |
| --- | --- |
| Softened water (added prior to reaction) | 17.85 |
| Tetraethylenepentamine | 11.22 |
| Epichlorohydrin | 8.77 |
| 50% NaOH in water | 7.59 |
| Softened water (added after reaction is completed) | 54.47 |

The 17.85 parts of softened water was added to a stainless steel jacketed reaction vessel. The tetraethylenepentamine was then added to the vessel with agitation. The epichlorohydrin was then added to the vessel gradually at a rate such as to produce the desired temperature. The temperature was controlled by a cooling jacket. After all of the epichlorohydrin had been added, the solution of NaOH in water was added rapidly while cooling the reaction vessel. The rest of the softened water was then added. At the time of the addition of the tetraethylenepentamine to the water, the temperature of the mixture was raised to 105° F. to 110° F. The epichlorohydrin was then added at such a rate as to bring the temperature up to and keep it at 130° F. to 135° F. This addition time was approximately 1½ hours. After all of the epichlorohydrin had been added and the temperature had just started to drop, the sodium hydroxide solution was added in a period of about 5 minutes. The temperature rose to a peak and then dropped. After the temperature had reached a peak and had dropped about 110-115° F., the water in the cooling jacket was cut off and the rest of the softened water was added to the vessel as rapidly as possible. The pH of the finished 20% polymer solution was 12.6.

In this example the sodium hydroxide solution was added in order to force the reaction, stabilize the product and reduce corrosion.

In the foregoing preparation the molar ratio of epichlorohydrin to tetraethylenepentamine was approximately 1.6:1. Under the same general reaction conditions, if the molar ratio of the epichlorohydrin to the tetraethylenepentamine is varied starting at 1.9:1 and reducing it, there is no appreciable change in quality until a ratio of 1.4:1 is reached where the activity appears to lower rather sharply. Effective products can be prepared using a ratio of 1.1:1 although such products are not as good as those of smaller ratios. Various contaminants such as succinic acid, isopropanol, ethanolamine and citric acid cause the product to gel and therefore should be avoided.

B. POLYETHYLENEIMINES

These polymers are condensation products of either (a) dihaloalkanes and ammonia, (b) autocondensation products of alkyleneimines, or (c) condensation products of polyalkylene polyamines and formaldehyde.

The polyimines are derived, for example, by the homopolymerization of monomers containing the imino radical:

The monomers preferably employed contain not more than 7 carbon atoms. Of the monomers employed for making polyimines, some of those best suited for the purpose of the invention are classified as substituted ethyleneimines and have the structural formula:

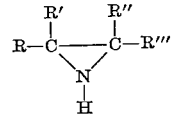

wherein R, R', R'', and R''' are either hydrogen or acyclic hydrocarbon radicals containing from 1 to 3 carbon atoms.

Examples of such monomers are the following:

A. ETHYLENEIMINE

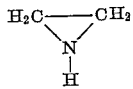

B. 1,2-PROPYLENEIMINE

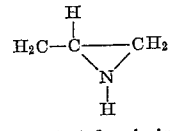

C. 1,2-butyleneimine

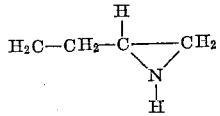

D. 2,2-dimethylethyleneimine

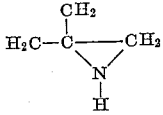

E. 2,3-butyleneimine

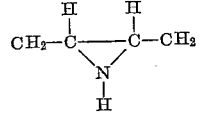

F. 2,2-dimethyl,3-n-propylethyleneimine

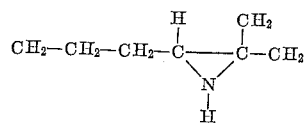

Other monomers capable of producing polymers suitable for the practice of this invention are trimethyleneimine which has the structural formula:

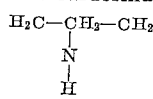

and its lower alkyl substituted derivatives in which one or more of the hydrogen atoms attached to a carbon atom is substituted by an alkyl group containing not more than 3 carbon atoms, i.e. methyl, ethyl, and propyl.

Ethyleneimine, as well as many of its derivatives, may be prepared by any of several well-known methods such as are described in the "Journal of American Chemical Society," vol. 57, p. 2328 (1935), and Ber. 21, 1904 (1888).

The polymerization of ethyleneimine and its derivatives is usually conducted at reduced temperatures using acid catalysts such as HCl, $BF_3$, and the like. The polymerization of the various monomers listed above is described in detail in the "Journal of Organic Chemistry," vol. 9, p. 500 (1944).

The linear polyimines are characterized by a long acyclic or chain structure in which nitrogen atoms of imine groups are connected at intervals to carbon atoms. It will be recognized, therefore, that linear polyimines can be prepared not only by homopolymerization but also by condensation reactions with the elimination of a hydrohalide. Thus, ethylene dibromide or propylene dibromide can be condensed with diethylenetriamine, triethylenetetramine, tetraethylenepentamine, and/or dipropylenetriamine to produce polyimines, and the present invention contemplates the employment of such materials.

In general, the polyimines employed in the practice of the invention can be described as water soluble polyimines in which imino (—NH) groups are attached to carbon atoms and recur every two to three atoms in a main linear chain, preferably containing not more than six carbon atoms in any side chain. Where the imino groups are separated from each other by ethylene groups, the linear polyimines are referred to as polyethyleneimines. Where the imino groups are separated from each other by propylene groups, the linear polyimines are referred to as polypropyleneimines.

The molecular weight of the useful polymer should be at least 1000 and is preferably from 5000 to 50,000. If the condensation reactions from which these polymers are derived are allowed to continue for too long a period of time or the conditions are not suitable, infusible, water soluble resins may result. In the case of 2,2-dimethylethyleneimine, care must be used to control the reaction so that the materials produced are water soluble enough to be soluble at the effective concentrations.

Similarly, long chain water soluble polymers may be prepared by condensing formaldehyde with a polyalkylene polyamine such as tetraethylenepentamine to link the polyamines with a plurality of methylene bridges.

C. AMMONIA HALOHYDRIN CONDENSATES

The ammonia-epichlorohydrin polymers used in the practice of the invention are prepared by reacting aqueous ammonia at a molar ratio of about 0.66–6.0 mols of ammonia per mol of epichlorohydrin in the initial reaction mixture at a temperature between about 60° C. and 104° C. at atmospheric pressure for 0.5–24 hours—the higher the temperature, the shorter the reaction time and vice versa. Preferably, the reaction is carried out under reflux. At reflux, the reaction time will ordinarily be in the range of 1–4 hours. The temperature of reaction may be as high as approximately 130° C. if the condensation is carried out above atmospheric pressure—the temperature of reaction being mainly limited by the necessity for preventing the boiling off of excessive amounts of ammonia.

In order to obtain effective results, the condensation must be carried out in the presence of water. Hence, aqueous ammonia solutions are eminently suitable for the reaction. The concentration of the aqueous ammonia may be varied between about 10% and 34% by weight. Commercial aqueous ammonia solutions containing about 28% by weight of ammonia, may be employed with good success in the production of the polymers. With relatively high concentrations of ammonia, i.e., 28% ammonia solution, it is desirable to keep the ammonia to epichlorohydrin molar ratio at least 3:1 to avoid undesirable gelation of the condensate during production or storage. Products of lower mol ratios can be prepared from more dilute ammonia solutions. However, it is also possible to produce the polymers by bubbling gaseous ammonia into an epichlorohydrin water mixture. The amount of water present should sufficient so that the final product constitutes less than about 50% solids. The temperatures are those previously described.

Based on preliminary evaluations, it appears that the addition of aqueous ammonia to the epichlorohydrin is to be preferred over the reverse procedure in that the activity of the former product has been shown to be better than a product prepared by the addition of epichlorohydrin to aqueous ammonia under similar reaction conditions. The resulting product in all probability is a heterogeneous mixture of polymeric materials in all cases. The exact chemical structure of the resultant condensation polymers cannot be set forth with certainty, but it is known that the ammonia reacts with the epichlorohydrin at both the chlorine substituent and also the oxirane oxygen.

The production of the polymeric ammonia-epichlorohydrin condensate in dry form may be accomplished in one of several ways. The water of solution of the original condensate may be evaporated by first acidifying the solution with concentrated HCl or other inorganic acid to a pH in the range of about 1–5 with stirring and cooling—preferably keeping the temperature below 60° C. The acidified solution is then evaporated under vacuum at a temperature below 80° C. until the mixture becomes a cloudy white and relatively viscous, but still in a pourable state. A water miscible alcohol in which the polymer is insoluble, such as isopropyl alcohol, is then added, the alcohol mixed with the viscous polymer and thereafter decanted. This procedure may be repeated one or more times if necessary to remove the water. The decanted polymer is then placed in a vacuum oven in thin layers and dried for one or more days. The dried, hard material is then ground into a powder—usually having a very slight yellowish tinge.

Instead of HCl, concentrated sulfuric acid may be used for the acidification. Instead of isopropyl alcohol, water miscible solvents such as acetone, methanol, and the like may be used to remove the water after the initial evaporation. It is also possible to dry the acidified, evaporated, viscous polymer without going through the step of using water miscible solvent for further dehydrating the polymer before drying in a vacuum oven. Further, spray drying may be used instead of vacuum oven drying—the viscous, polymeric condensate being pumped counter-current to a current of hot, preferably inert, gas. The resulting dried product will yield about 75–90% of theoretical as solid epichlorohydrin-ammonia condensate.

While epichlorohydrin-ammonia condensates exhibit activity over the broad molar range of reactants previously described, it has been found that the condensates exhibiting the best activity, fall within the range of about 3.0–6.0 mols of ammonia per mol of epichlorohydrin in the initial reaction mixture. In the most preferred form of the invention the molar ratio will be within the range of 4.0±0.2 mols of ammonia per mol of epichlorohydrin.

The following examples illustrates these types of polymers:

*Example III*

Epichlorohydrin and ammonia, as a 28% aqueous solution, were reacted in a 1:4 molar ratio respectively by adding the aqueous ammonia solution to the epichlorohydrin over a period of ten minutes with agitation at about room temperature. The reaction was exothermic—raising the temperature to 98° C. After all of the aqueous ammonia had been added, the mixture at atmospheric pressure was heated under reflux for three hours to a maximum and final temperature of 104° C. The resulting product was a clear, almost colorless liquid constituting 48% by weight solids in aqueous solution.

*Example IV*

A solid epichlorohydrin ammonia condensate is prepared by acidifying the 48% aqueous solution of Example III with concentrated HCl to bring the pH to approximately 2 with stirring and sufficient cooling to keep the temperature below 60° C. The acidified solution is evaporated under vacuum at a temperature of about 50° C. until the mixture becomes cloudy white and very viscous, yet pourable. The viscous mixture is then mixed with 3 volumes of isopropyl alcohol after which the alcohol is decanted. The isopropyl alcohol treatment is repeated. The condensate is then dried in a vacuum oven in shallow pans at about 60° C. for three days. The dried, hard condensate is removed from the pans and ground into powder form. It has a slight yellow tinge.

D. AMINE ALDEHYDE AMIDE POLYMERS

These water soluble polymers or resins are from the class consisting of cationic amine-aldehyde resins and amidealdehyde resins, preferably hydrophilic melamine-formaldehyde resins or hydrophilic urea-formaldehyde resins.

These cationic resins are resinous materials carrying a positive electrical charge when in aqueous solution. For example, cationic melamine-aldehyde resins are resinous materials containing melamine and carrying a positive electrical charge when in aqueous solution.

These colloidal resin solution may be prepared by dissolving ordinary melamine-aldehyde condensation products, such as methylol melamines, in acids such as hydrochloric acid, to form acidified or acid-type resin solutions having a glass electrode pH value within the range of about 0.5 to about 3.5 when measured at 15% solids, or pH values up to 4.5 when measured in more dilute solutions, followed by aging to the colloidal condition, as described in U.S. Patent 2,345,543.

Another class of cationic melamine-aldehyde resins that may be used in practicing the present invention are the resinous copolymers of melamine, urea and aldehydes such as formaldehyde containing at least 0.7 mol of melamine for each 4 mols of urea and about 1 to 4 mols of combined formaldehyde for each mol of melamine plus urea. Such resins are described in U.S. Patent 2,485,079. These cationic melamine resin copolymers are obtained by first preparing an acidified aqueous solution of an aldehyde condensation product of melamine and urea containing 1 to 70 mol percent of urea and 30 to 99% of melamine and about 0.2 to 1.5 mols of acid per mol of melamine, depending on the strength of the acid, and aging the solution until the colloidal cationic condition us reached.

An important feature of the invention resides in the fact that the treated turbid water must not form a floc before entering the filter. As a general rule floc formation will be evidenced by a rapid plugging of the filter or by poor filtration results. As a general rule, the amount of mixing required should be such that uniform flow rates are established without forming any zones of slow flow rates or zones of quiescence.

An important method of insuring that floc formation does not occur is to use less than a floc forming dosage of the water soluble cationic polymer. In all cases, floc forming dosages for a particular turbid water provides too much treatment to be operative in this invention. The dosage of the water soluble cationic polymer must be maintained continuously and at a fixed rate. That is to say, if two parts per million gives good results, substantial fluctuations in dosage in excess of this amount will cause the process to fail. The effective treating ranges for most low turbidity waters are between 0.01 and 50 parts per million. Amounts in excess of these dosages do not show any beneficial results. Slug feeding to the influent line or treating the filter with excessive amounts of the polymers give no results whatsoever.

In most cases, flow rates that may be used satisfactorily without inducing floc formation are filter rates of at least 2 gallons per minute per square foot of surface area and do not exceed six gallons per minute per square foot of filter area in a preferred embodiment. Good results are obtained where the flow rate is maintained between 2 and 4 gallons per minute per square foot of filter area. In some instances, flow rates as high as 12 gallons per minute per square foot have been used without deterring from the results obtained.

The invention is not restricted to any type or particular unit and it may be employed satisfactorily in both gravity and pressure filtration units. When used in pressure filters the invention frequently employs increased flow rates through the filter unit without damaging the efficiency or impairing the characteristics.

Reference has been made throughout the specification to turbid waters containing finely divided suspended solids. The waters containing suspended solids upon which the invention operates are waters where the solid matter is in such a state of subdivision that it does not normally settle from the water upon standing. The particular size range of such non-settling solids varies from about 150 millimicrons in particle size to particles which are just below or within the range of visual observation of the individual particles present, viz. one to several hundred microns in average particle size diameter. In the case of colloidally suspended organic coloring matter, the particle size may be somewhat smaller than 150 millimicrons.

When referring to floc formation, it is intended to indicate the principle of colloidal chemistry whereby the finely divided particles are aggregated into larger particles which are of sufficient size and density to become visual to the naked eye and rapidly settle from suspension. This phenomenon is well known in the water treatment art and is believed to be understood without further explanation.

The filter media most successfully used in the practice of the invention are sand or finely divided anthracite coal. The sand may be either fine, medium, or coarse, depending upon the nature of the water to be treated. Fine sand may be classified as having effective size of 0.35–0.45 mm. Medium sand has an effective size of 0.45–0.55 mm.; coarse sand has an effective size of 0.55 mm. or greater. The invention is most effective in waters contacting medium sand. The anthracite coal will also be of a finely divided size within the ranges specified for the sand and in addition should have a specific gravity not less than 1.55 and a Mohs' hardness of between 3.0 and 3.75.

EVALUATION OF THE INVENTION

The following examples illustrate the invention in several of its aspects.

*Example V*

This example demonstrates the importance of not forming a floc during the operation of the process.

The filter was a granite sand filter operated at a normal flow rate of 2.28 g./sq. ft./min. The input water to the system had a suspended solids content of 10 p.p.m. as $SiO_2$ and a color value of 50 APHA units. Before the filter was a conventional up-flow sludge blanket clarifier. When the water was coagulated with good floc formation with 30 p.p.m. of alum and 10 p.p.m. of activated silica and then passed through the filter, the filter effluent had a color reduction of about 10 APHA units.

A test was then conducted by feeding the composition of Example II through a water pump, which was used to feed the raw water to the unit. The pump was adjusted to give a thorough mixing of the chemical with the water. The treated water passed through the clarifier which was not operated during the test. The dosage of the chemical was started at 10 p.p.m. The unit was run at this dosage for two hours to insure the filter had contacted sufficient amount of the polymer. The dosage was then cut back to 5 p.p.m., and at the end of three hours a sample of the filter effluent showed a color reduction of 20 APHA units. The dosage was reduced to 2.25 parts per million. After three more hours, the color reduction was 15 APHA units. There was no increase in the normal backwashing cycles.

For purposes of comparison, the filter was backwashed and the treatment was applied to the filter by slug feeding 170 parts per million directly to the filter. The unit was then put on stream at normal flow rates. Pressure differential across the bed increased rapidly so that it was necessary to backwash the filter after three hours' operation. Normal filter runs without treatment averaged twelve hours before backwashing was necessary. Inspection of the water entering the filter show the presence of floc particles.

*Example VI*

The filters used in the test were anthracite side stream filters connected to a cooling tower basin. The input through these filters was 100 gallons per minute. The average input turbidity was 50 parts per million Hellige, expressed as $SiO_2$. The treatment used was per Example II, which was fed to the filters using a set-up similar to that shown in the drawing. The first test which was conducted on one filter was designed to test varying concentrations of the polymer. These results are reported below in Table I:

TABLE I

| Time in Hours | Polymer (p.p.m.) | Turbidity (p.p.m. $SiO_2$) |
|---|---|---|
| 0 | 0 | 50 |
| 1 | 0 | 50 |
| 2 | 20 | 12 |
| 3 | 0 | 48 |
| 4 | 20 | 12 |
| 5 | 5.7 | 12 |
| 6 | 0 | 22 |

When the filters were treated at 20 parts per million, there was indication of floc formation due to an increase in the water head in the filter. When the dosage was maintained at 5.7 parts per million of the polymer, the rise in the head began to drop sharply, indicating floc formation had ceased to occur; yet the turbidity removal remained fairly constant.

*Example VII*

In the same plant, another filter was treated in a similar fashion to that used in Example VI, using the polymer of Example II. The filter was first treated with 20 parts per million for one hour and then the dosage was maintained between 3.4 and 1.6 parts per million for three hours. At the 3.4 part-per-million dosage, the turbidity was reduced to 6 parts per million. When the dosage was reduced to 1.6 parts per million, the turbidity increased to 14 parts per million. The 20 part-per-million treatment had reduced the turbidity to 5 parts per million, but at this particular dosage floc formation was evidenced. This series of tests shows that, at between 1.6 and 20 parts per million, 3.4 parts per million gave optimum results without having floc formation occur and filter plugging.

In both Examples VI and VII, under conditions of optimum treatment, the filters were run for their normal operating cycles without any diminution in effectiveness. Normal back-washing procedures easily removed the entrained matter from the filter beds.

*Example VIII*

In this test, the filters were four sand filters, each having 730 square feet of filter area. The normal flow rate through these filters was 3 gallons per square foot per minute. The turbidity input was 8 parts per million and the effluent was 5.7 parts per million. The normal color influent was 45 APHA, which was not removed by passing the water through the filter. A typical analysis of the water showed it to contain 145 parts per million of hardness, a methyl orange alkalinity of 121 parts per million, a chloride content of 17 parts per million and with the pH being approximately 7.3.

Tests were conducted on these filters using varying amounts of the polymer of Example II to determine optimum concentrations. The results of these tests are presented below.

TABLE II

| Polymer, Example II (p.p.m.) | ALPHA color |
|---|---|
| Blank | 40 |
| 3 | 30 |
| 5 | 25 |
| 7 | 20 |
| 10 | 15 |

The above shows that between 7 and 10 parts per million gives a substantial color reduction. In all of the above cases, the turbidity was reduced to between 1 and 3.2 parts per million. Although not shown in the table, the dosage was increased to 20 parts per million and filter plugging began to occur due to entrainment of floc particles.

*Example IX*

A series of laboratory tests were conducted on a highly turbid water which contained 45 to 50 parts per million of turbidity. The filter was a four-foot long glass tube 1¼ inch inside diameter. The flow rates for the tests were adjusted to 2.5 gallons per square foot per hour. Several of the compositions of the invention were tested along with several of the water soluble cationic reagents to see if similar results could be obtained. The results of these experiments are presented below in Table III.

TABLE III

| Composition | Dosage | Turbidity |
|---|---|---|
| Polymer of Example II | 40 | 9 |
| N-tallow trimethylene diamine-hydrochloride | 40 | 49 |
| Dehydrogenated tallow hydrochloride | 40 | 34 |
| Dehydrogenated tallow dimethyl ammonium chloride | 40 | 36 |
| Polyethyleneimine (Av. M.W. 40,000 50% solution) | 25 | 8 |

From the above, it is apparent that only the cationic reagents of the invention are effective in the processes described and the other classes of cationic materials which are known coagulants show little or no effectiveness.

The invention provides a simple and effective means for improving the ability of filters to remove turbidity and/or coloring matter from many types of waters. The process is clearly distinguishable from prior art clarification techniques such as coagulation, since the process is conducted using non-coagulating dosages of chemicals under conditions not favoring floc formation, and the chemicals are fed to the water at a continuous, uniform dosage.

In many waters which are difficult to clarify the dosage of the chemical will be relatively large in comparison to dosages used to treat other waters. Actual experience has shown that, regardless of how high the dosage required for optimum results, the amount of the same cationic water soluble polymer required to coagulate the same water is in excess of such optimum dosage.

The invention is claimed as follows:

1. A process of filtering a low turbidity aqueous liquid containing finely divided suspended solids which comprises, first uniformly mixing a quantity of a water soluble cationic polymer from the group consisting of polyethyleneimines, hydrophilic alkylene polyamine polyfunctional halohydrin polymers resulting from the condensation polymerization of an alkylene polyamine and a halohydrin in an aqueous solution to a thickened sub-resinous condition short of gel formation and polymers of polyfunctional halohydrins and ammonia with a low turbidity aqueous liquid, the quantity of the polymer and the degree of mixing being adjusted so that a visible floc is not formed but the rate of filtration is increased, and thereafter before any visible floc is formed passing the thus treated mixture through a filtering zone which contains a natural filter medium from the group consisting of sand and anthracite coal.

2. A process of filtering a low turbidity aqueous liquid containing finely divided solids, a portion of which is composed of organic coloring matter, which comprises, first uniformly mixing a quantity of a treating composition comprising a water soluble cationic polymer from the group consisting of polyethyleneimines, hydrophilic alkylene polyamine polyfunctional halohydrin polymers resulting from the condensation polymerization of an alkylene polyamine and a halohydrin in an aqueous solution to a thickened sub-resinous condition short of gel formation, and polymers of polyfunctional halohydrins and ammonia and alum used together in a weight ratio to each other of from 1:3 to 1:10 with said low turbidity liquid by mixing of said liquid after addition of said treating composition to the liquid, the quantity of the additive treating composition and the degree of mixing being adjusted so that a visible floc is not formed but the rate of filtration is increased, and thereafter before any visible floc is formed passing the thus treated mixture to a filtering zone which contains a natural filter medium from the group consisting of sand and anthracite coal.

3. A process of filtering aqueous liquids containing finely divided suspended solids in accordance with claim 1 where the water soluble cationic polymer is a hydrophilic alkylene polyamine polyfunctional halohydrin polymer solution resulting from the condensation polymerization of an alkylene polyamine and a halohydrin in an aqueous solution to a thickened sub-resinous condition short of gel formation.

4. A process of filtering aqueous liquids containing finely divided suspended solids in accordance with claim 3 where the hydrophilic polymer is a reaction product in excess of one mole but less than two moles of epichlorohydrin per mole of tetraethylenepentamine.

5. A process of filtering aqueous liquids containing finely divided suspended solids in accordance with claim 1 where the water soluble cationic polymer is a polyethyleneimine.

6. A process of filtering aqueous liquids containing finely divided suspended solids in accordance with claim 1 where the water soluble cationic polymer is prepared by reacting ammonia and an epihalohydrin at a molar ratio of about three to six at a temperature between 60° C. to 130° C. for from ½ to 24 hours.

7. A process as claimed in claim 1 in which the filter rate is within the range of 2 to 6 gallons per minute per square foot of filter area.

References Cited in the file of this patent

UNITED STATES PATENTS

| | | |
|---|---|---|
| 2,124,580 | Lavine | July 26, 1938 |
| 2,601,597 | Daniel et al. | June 24, 1952 |
| 2,778,499 | Chamberlain et al. | Jan. 22, 1957 |
| 2,926,154 | Keim | Feb. 23, 1960 |
| 2,937,143 | Goren | May 17, 1960 |
| 2,995,512 | Weidner et al. | Aug. 8, 1961 |

FOREIGN PATENTS

| | | |
|---|---|---|
| 154,799 | Australia | Jan. 19, 1954 |

OTHER REFERENCES

Water and Sewage Works (periodical), vol. 102, No. 12 (November 1955), article by Symons, pp. 470–475.

"'Separan 2610' in Water Treatment," October 1956, 26 pp., pp. 2, 8, 9, 12, 4A and 5A particularly relied upon.

"'Separan 2610' in Waste as Sewage Treatment," October 1956, 27 pp., page 1 of particular interest.